United States Patent
Slaughter et al.

[11] Patent Number: 6,119,476
[45] Date of Patent: Sep. 19, 2000

[54] APPARATUS FOR PROLONGING BAIT LIFE

[76] Inventors: Marion W. Slaughter, 1902 Spillers, Houston, Tex. 77047; Daniel P. Slaughter, 8732 Camfield Way St., Frisco, Tex. 75034

[21] Appl. No.: 09/313,321

[22] Filed: May 17, 1999

[51] Int. Cl.$^7$ ...................................................... F25D 3/08
[52] U.S. Cl. ............................... 62/371; 62/530; 62/457.2
[58] Field of Search .......................... 62/371, 530, 457.2, 62/457.7

[56] References Cited

U.S. PATENT DOCUMENTS

| | | | |
|---|---|---|---|
| 4,441,336 | 4/1984 | Cannon | 62/457 |
| 4,671,079 | 6/1987 | Petrantoni | 62/457 |
| 5,299,424 | 4/1994 | Woodson et al. | 62/3.7 |
| 5,568,735 | 10/1996 | Newkirk et al. | 62/530 X |
| 5,619,867 | 4/1997 | Slaughter | 62/530 |

FOREIGN PATENT DOCUMENTS 405288443  11/1993  Japan .

Primary Examiner—William Doerrler
Assistant Examiner—Chen-Wen Jiang
Attorney, Agent, or Firm—Bill B. Berryhill

[57] ABSTRACT

Apparatus for cooling and retarding temperature elevation of liquids in a vessel having a bottom, side walls and end walls forming an enclosure for receiving the liquids. The vessel is provided with at least one compartment having a bottom and sides forming a pocket in which one or more containers of slow-to-freeze, slow-to-thaw gelatinous material may be placed. Support members are attached to and support the compartment so that it does not contact the bottom or walls of the vessel, allowing liquid in the vessel to freely flow around the bottom and sides of the compartment.

12 Claims, 2 Drawing Sheets

APPARATUS FOR PROLONGING BAIT LIFE

BACKGROUND OF THE INVENTION

1. Field of the Invention

The present invention pertains to apparatus for prolonging the life of fishing bait. More specifically, the present invention pertains to apparatus suitable for cooling and retarding temperature elevation of water in a bait container or vessel to prolong the life of bait therein.

2. Description of the Prior Art

Both commercial fisherman and those who fish for sport generally prefer live bait, e.g. shrimp, minnows, etc. The live bait is usually placed in a water filled vessel of some type, the water being at a temperature approximating the temperature of the water from which the bait is removed. Many boats are provided with such a vessel, sometimes referred to as a "bait well". Others simply place the live bait in a bucket or some other type of vessel.

Shrimp, minnows and other live bait can only survive with a sufficient oxygen supply and in a habitat of certain temperature ranges. As water temperature increases, the water holds less oxygen. In warm water, the metabolism of cold blooded animals, such as shrimp and minnows, tends to speed up, increasing oxygen consumption and toxic waste production. It is therefore necessary, to keep the water cool, preferably around 70° F. in the summer. At this temperature, bait will not only use less oxygen, but the water will more easily absorb oxygen when aerated. If live shrimp are caught or purchased from water at a temperature greater than 70° F., the water in which the bait is kept should be cooled to as near 70° F. as possible. However, the shrimp should be gradually acclimated to this temperature in the bait container. Shrimp can tolerate a change of 5° F. per half hour. A change more abrupt than this will shock the shrimp.

Many fishermen begin fishing early in the morning, the coolest part of the day. As the day progresses, the bait well or other vessel containing the bait is subjected to increasing temperatures and in many cases direct exposure to the sun. As this occurs, the temperature of the water in which the bait is contained increases, sometimes by as much as 10° F. to 20° F. Due to the increased metabolism of the bait, increased oxygen consumption and toxic waste production, the bait may die in just two hours. It is common knowledge that dead bait is not as attractive to fish as live bait.

Large commercial fishing vessels may be provided with bait wells which are refrigerated. Such refrigeration systems require a source of power and are relatively expensive, particularly for the small commercial fisherman or the pleasure fisherman. In the past, the most convenient way for the small commercial fisherman or pleasure fisherman to cool the water in which the bait is placed has been to add ice thereto. However, ice melts rapidly and must be continuously replenished. Furthermore, unless the ice is made from a composition of water similar to the water in which the bait is held, the ice water may alter the salinity or other composition of the water in which the bait is held. Although salinity is not as critical as temperature, changes in water composition also contribute to death of the bait. More satisfactory solutions for keeping bait alive over a longer period of time are needed.

SUMMARY OF THE PRESENT INVENTION

In the present invention, apparatus is provided for cooling and retarding temperature elevation of a liquid, such as water, contained in a vessel which is subject to external influences. The apparatus comprises a vessel which may contain water into which bait may be placed. The vessel is provided, preferably at the ends thereof, with one or more compartments in which one or more sealed containers of packets of slow-to-freeze, slow-to-thaw gelatinous material may be placed. The packets of gelatinous material, sealed in the containers, are typically frozen prior to placement of the containers in the compartments.

The containers and the packets of gelatinous material sealed therein are so designed that when the sealed containers of frozen slow-to-freeze, slow-to-thaw gelatinous material are placed in the compartments the temperature of the liquid in the vessel, after the initial half hour, will not be raised or lowered more than 2° F. to 3° F. per half hour for a period of at least ten hours.

The apparatus is also designed so that the shrimp, minnows or other bait in the vessel are separated from the cooling compartments and any sharp corners thereof. In fact, barriers are provided to confine the bait to a space easily accessible by nets or other devices used to remove bait from the vessel.

Thus, the present invention provides apparatus for cooling and maintaining the temperature of liquid, specifically water, in a vessel in which shrimp, minnows or other bait may be placed so that the bait will live for a substantial period of time, ten hours or longer, even though the temperature increases and even though the vessel is subjected to the sun. The apparatus is simple to manufacture, inexpensive and especially easy to use so that it would be available to any fisherman. Many other objects and advantages of the invention will be seen upon reading the specifications which follow in conjunction with the accompanying drawings.

DESCRIPTION OF PREFERRED EMBODIMENTS

Figure 1:
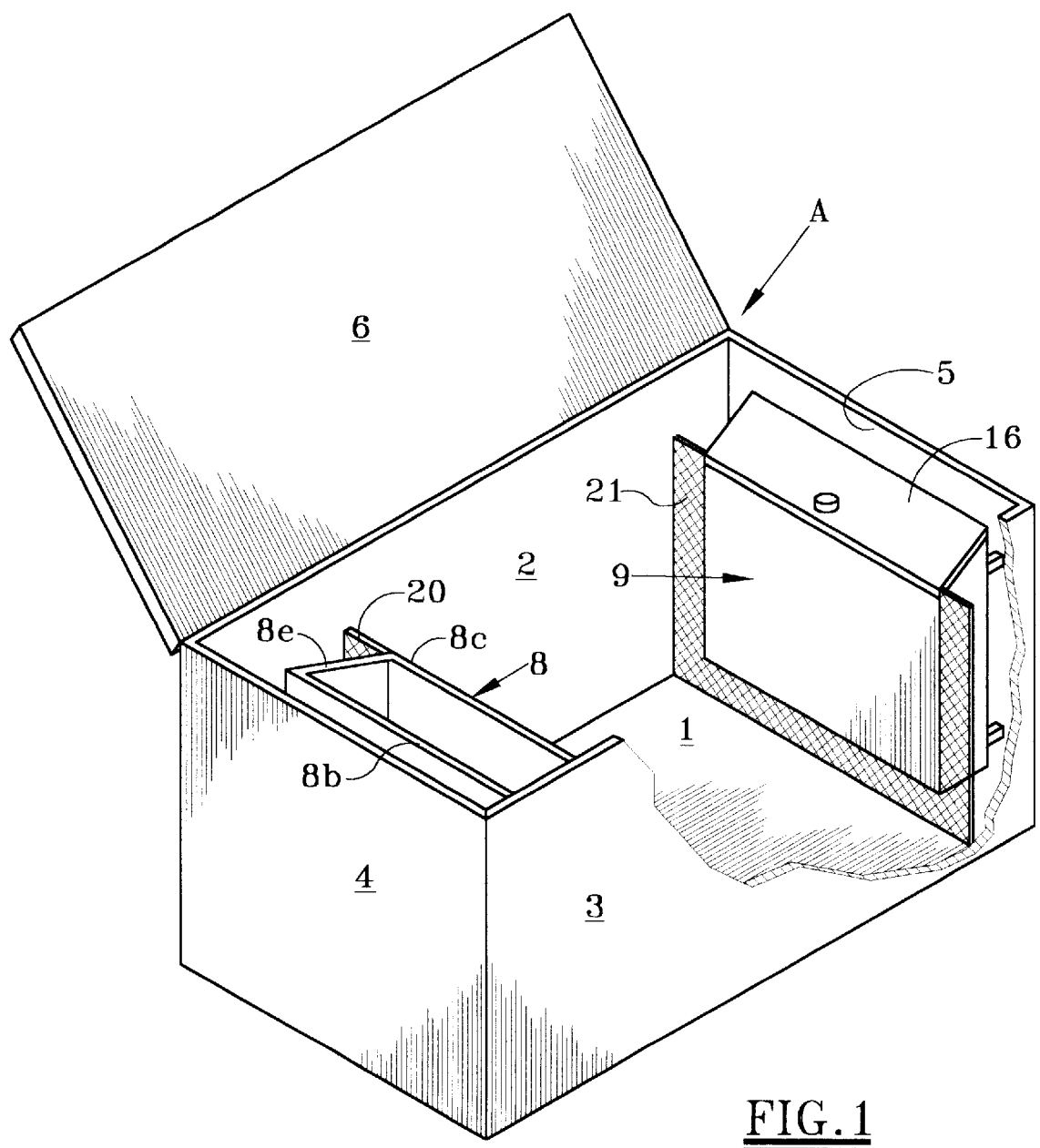
FIG. 1 is a perspective view of the apparatus of the present invention, according to a preferred embodiment thereof, a portion of the apparatus being cut away for a better understanding thereof.
Figure 2:
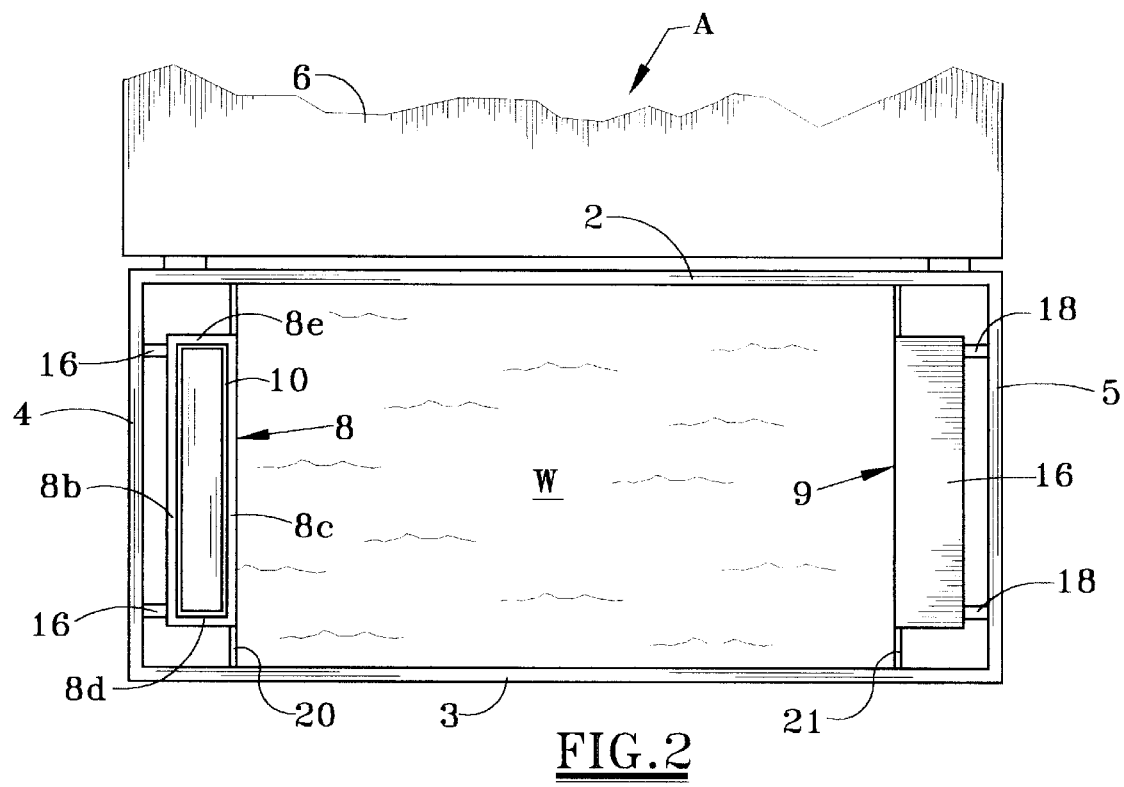
FIG. 2 is a top view of the apparatus of the present invention, the lid thereof being opened and partially cut away.
Figure 3:
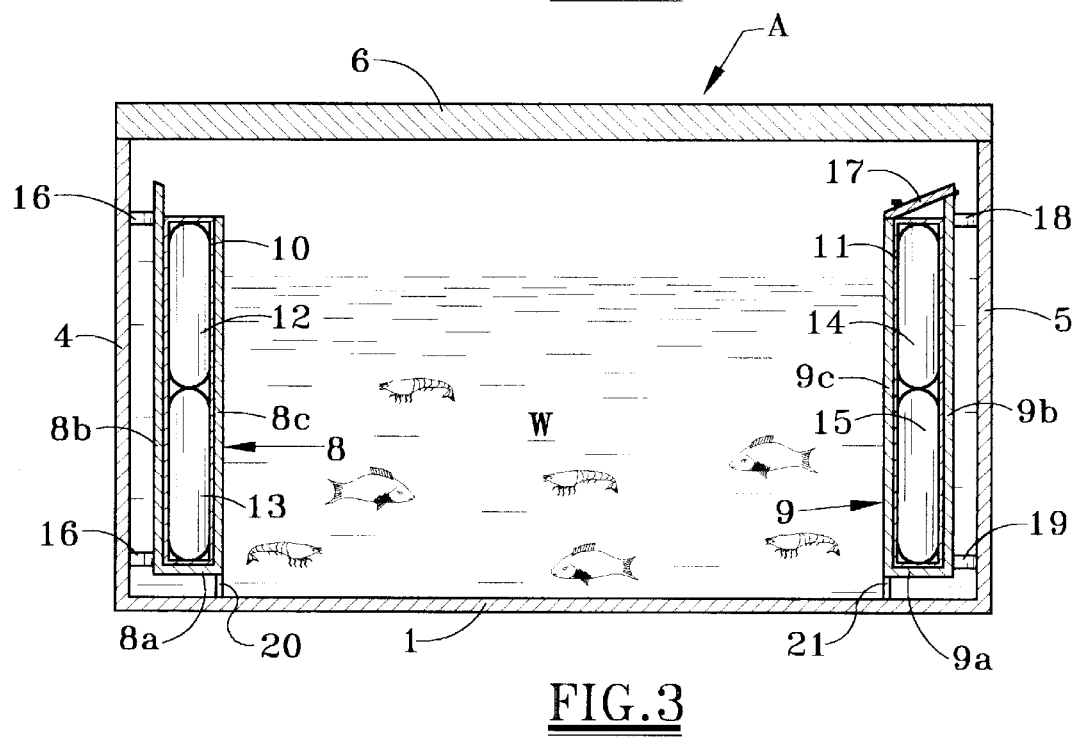
FIG. 3 is an elevation, in section, of the apparatus of the present invention, according to the preferred embodiment of FIGS. 1 and 2.

Referring now to all the drawings, FIGS. 1–3, there is shown apparatus A for cooling and retarding temperature elevation of liquid contained in the apparatus, according to a preferred embodiment thereof. Although the apparatus A has other uses, it is primarily designed to hold and maintain bait, such as shrimp, minnows or the like (see FIG. 3) in a life supporting environment sufficient to keep the bait alive for at least a twelve to fifteen hour period of time.

In a preferred embodiment, the apparatus A comprises a vessel formed from a bottom 1 and upwardly extending walls 2, 3, 4, and 5. Walls 2 and 3 may be referred to as side walls and walls 4 and 5 may be referred to as end walls. This vessel therefore forms an enclosure capable of receiving liquids such as the water W illustrated in FIGS. 2 and 3. A lid or cover 6 which may or may not be hingedly connected to one of the side walls 2 of the vessel may be provided to close the top of the vessel if so desired. If closed, provisions should be made to allow enough air or oxygen to enter the vessel for keeping the bait therein alive.

In the preferred embodiment of FIGS. 1–3, the apparatus is provided with compartments 8 and 9 at each end thereof. Each of these compartments 8, 9 has a bottom 8a, 9a sidewalls 8b, 8c, 9b, 9c and end walls 8d, 8e, 9d, 9e forming pockets in which containers 10, 11 of one or more packets 12, 13, 14, 15 of slow-to-freeze, slow-to-thaw gelatinous material may be placed. Each of the compartments 8 and 9 may be provided with a top opening through which the containers 10, 11 of gelatinous material 12–15 may be placed and/or removed. Each of the compartments 8, 9 is preferably provided with a closure member such as the closure 16 of the compartment 9 which is moveable between a closed position closing the opening and an opened position opening the opening. A seal (not shown) may be provided to sealingly engage the closure 16 and the compartment 9 to seal the compartment pocket against any liquids in the vessel. Although the compartment 8 would preferably be provided with a similar closure member, the closure member of the compartment 8 has been removed in FIGS. 1–3 for a clearer view thereof. In fact, container 10 has also been removed from FIG. 1 for a better internal view of the compartment 8.

The containers 10 and 11 are preferably thin wall metal containers in which one or more packets of gelatinous material are permanently sealed. The gelatinous material in each of the packets 12–15 is a slow-to-freeze, slow-to-thaw material and is preferably a blend of water soluble polymers derived from cellulose, a natural carbohydrate containing the univalent hydroxyl group OH. Each of the packets 12–15 of gelatinous material is also preferably surrounded by thermal insulation. Heat is transferred from the water W through the walls of the compartments 8, 9 and the containers 10, 11 into the frozen gel in the packets 12–15. Each of the packets of gelatinous material 12–15 may be surrounded by insulation which provides different rates of heat transfer and the packets may be selected to specifically provide a preselected rate of heat transfer.

In the exemplary embodiment of FIGS. 1–3, support members 16, 17 and 18, 19 are attached to each of the compartments 8 and 9 supporting the receptacles 8 and 9 so that they do not contact the bottom 1 or walls 2–5 of the vessel, allowing the water W in the vessel to freely flow around the bottom and sides of the compartments 8–9. In the exemplary embodiment, screen members 20 and 21, the outer edges of which are disposed along the bottom 1 and two sides 2, 3 of the vessel form a barrier adjacent the bottom and sides of the compartments 8 and 9 to prevent any object, specifically the bait within the vessel, from moving past the compartments 8 and 9. Thus the bait is confined to the space between compartments 8 and 9 to keep the bait essentially separated from cooling containers 10, 11, compartments 8, 9 and from any sharp corners associated therewith. By confining the bait to this space they are also easily accessible by nets or other devices used to remove bait from the vessel.

As previously stated, the gel packets 12–15 contain a slow-to-freeze, slow-to-thaw gelatinous material having a freeze cycle of approximately eight hours. The thaw cycle would be one and one-half to two times longer, i.e. twelve to sixteen hours. In a preferred embodiment, each of the gel packets 12–15 would be wrapped in an individualized R-Value rated grade of thermal insulation. For example, each of the four packets could be enclosed in preselected thermal resistance rated type of insulation of differing heat transfer; e.g. a 3M material sold under the trademark "Thinsulate", i.e. C-40, C-70, C-100 and C-200. Each of the four gel packets performs a specific proportion of the overall heat transfer. All four are preselected to work in unison to effect the desired outcome, the maintenance of twelve to sixteen hours of maintaining survivable temperatures for the bait. For example, the containers 10, 11 and their packets 12–15 may be preselected and put in place, causing temperature of the bait water W to decrease by an average of approximately 2° F. per hour during the first six to eight hours to a low of 68° F.–72° F. At this temperature the bait water and the cooling body temperatures are essentially the same. Although the outside temperature will eventually affect the apparatus and the temperature of the bait water, the temperature of the bait water will gradually increase, at a rate of approximately 1¼° F. to 1¾° F. per hour, this arrangement will have added at least another six to eight hours of survivable temperature, making a total of twelve to sixteen hours of fishing with initially purchased live bait. This period of time could be extended even longer by replacing one or both of the containers 10, 11 with other containers of frozen gel packets.

Thus, the apparatus of the present invention is very effective in providing a temperature environment for live bait in which the bait would be kept alive for long periods of time (twelve to twenty-four hours). Although the present invention has been described for use as a live bait container, it is not limited to such use and could be used to keep fish alive for fishing tournaments or in any other situation to retard an increase in the temperature of water or other liquids in a liquid containing vessel.

A single preferred embodiment of the invention has been described herein. However, many variations of the invention can be made by those skilled in the art without departing from the spirit thereof. Accordingly, it is intended that the scope of the invention be limited only by the claims which follow.

What is claimed is:

1. Apparatus for cooling and retarding temperature elevation of liquids contained in said apparatus, said apparatus comprising:

a vessel having a bottom and upwardly extending walls forming an enclosure for receiving liquids;

at least one compartment having a bottom and sides forming a pocket in which one or more containers of slow-to-freeze, slow-to-thaw gelatinous material may be placed;

support means attached to and supporting said compartment within said vessel so that it does not contact the bottom or walls of said vessel, allowing any liquids in said vessel to freely flow around said bottom and sides of said compartment; and a perforated barrier disposed in the spaces between said bottom and sides of said vessel and said bottom and sides of said compartment to prevent any object within said vessel from moving past said container through said spaces.

2. The apparatus of claim 1 in which said compartment has a top provided with an opening through which said one or more containers of gelatinous material may be placed and removed.

3. The apparatus of claim 2 in which said compartment comprises a closure member associated with said compartment opening and which is moveable between a closed position closing said opening and an open position opening said opening.

4. The apparatus of claim 3 including seal means engaging said closure member and said compartment when said closure member is in said closed position to seal said compartment pocket against any liquids in said vessel.

5. The apparatus of claim 1 in which at least one of said containers sealingly contains at least two packets of said gelatinous material, each of said packets being surrounded by thermal insulation providing different rates of heat transfer for each of said packets.

6. Apparatus for cooling and retarding temperature elevation of liquids contained in said apparatus, said apparatus comprising:

a vessel having a bottom, side walls and end walls forming an enclosure for receiving liquids;

at least one compartment having a bottom and sides forming a pocket in which one or more containers of slow-to-freeze, slow-to-thaw gelatinous material may be placed; and support members attached to and supporting said compartment so that it does not contact the bottom or walls of said vessel, allowing liquid in said vessel to freely flow around said bottom and sides of said compartment.

7. The apparatus of claim 6 including a screen member the outer edges of which are disposed along the bottom and two sides of said vessel forming a barrier adjacent the bottom and sides of said compartment to prevent any object within said vessel from moving past said compartment.

8. The apparatus of claim 6 in which said compartment is provided with an opening through which said one or more containers of gelatinous material may be placed or removed.

9. The apparatus of claim 6 including another compartment having a bottom and sides forming a pocket in which one or more containers of slow-to-freeze, slow-to-thaw gelatinous material may be placed and supported by other support members so that it does not contact the bottom or walls of said vessel, allowing any liquid in said vessel to freely flow around said bottom and sides of said another compartment.

10. The apparatus of claim 9 including screen members associated with each of said compartments the outer edges of said screen members being disposed along the bottom and two sides of said vessel forming barriers adjacent the bottom and sides of each compartment to confine any object within said vessel to a space between said compartments.

11. The apparatus of claim 9 in which at least one of said containers includes at least two packets of said gelatinous material, each of said two packets being surrounded by thermal insulation providing different rates of heat transfer for each of said two packets.

12. The apparatus of claim 9 in which each of said containers includes at least two packets of said gelatinous material each of which is surrounded by thermal insulation providing predetermined rates of heat transfer.

* * * * *